(12) United States Patent
Ichise et al.

(10) Patent No.: US 8,435,019 B2
(45) Date of Patent: May 7, 2013

(54) VEHICLE-AIR-CONDITIONER ELECTRIC COMPRESSOR

(75) Inventors: Yuki Ichise, Aichi (JP); Takayuki Watanabe, Aichi (JP); Takeshi Hirano, Aichi (JP); Akinori Yoshioka, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 712 days.

(21) Appl. No.: 12/442,041

(22) PCT Filed: Oct. 31, 2008

(86) PCT No.: PCT/JP2008/069883
§ 371 (c)(1),
(2), (4) Date: Mar. 19, 2009

(87) PCT Pub. No.: WO2009/060796
PCT Pub. Date: May 14, 2009

(65) Prior Publication Data
US 2010/0172770 A1    Jul. 8, 2010

(30) Foreign Application Priority Data

Nov. 6, 2007    (JP) ................................. 2007-288822

(51) Int. Cl.
*F04B 35/04* (2006.01)
*F04B 39/02* (2006.01)
*H05K 7/20* (2006.01)

(52) U.S. Cl.
USPC ..................... 417/423.7; 417/366; 417/410.1

(58) Field of Classification Search ................. 417/366, 417/410.1, 423.7
See application file for complete search history.

(56) References Cited

U.S. PATENT DOCUMENTS 6,288,866 B1 *    9/2001    Butler et al. ............... 360/97.01
2003/0200761 A1 *  10/2003    Funahashi et al. ........... 62/228.4

FOREIGN PATENT DOCUMENTS

| JP | 58-56488 U | 4/1983 |
| JP | 2-9493 U | 1/1990 |
| JP | 2002-26467 A | 1/2002 |

(Continued)

OTHER PUBLICATIONS

International Search Report of PCT/JP2008/069883, dated of mailing date Feb. 10, 2009.

*Primary Examiner* — Joseph L Williams
(74) *Attorney, Agent, or Firm* — Westerman, Hattori, Daniels & Adrian, LLP (57) ABSTRACT

An object is to provide a highly reliable vehicle-air-conditioner electric compressor of an inverter-integrated type that minimizes vibration and deformation of a board and a bus bar caused by vibration of a vehicle so as to prevent devices from becoming detached, to prevent soldered sections and welded sections from rupturing, and to prevent short circuits from occurring. In a vehicle-air-conditioner electric compressor (1) in which an inverter accommodating section (11) is provided at a periphery of a housing (2) and an inverter (20) is accommodated inside the inverter accommodating section (11), a control board (26) constituting the inverter (20) is screwed to fixing-screw base surfaces (29) provided at a plurality of locations of the inverter accommodating section (11), and a base (40) that has the same height as the fixing-screw base surfaces (29) and supports the control board (26) near substantially a midpoint of a fixing-screw pitch on the control board (26) and/or near a position where a large component is disposed on the control board (26) is provided at one or more locations of the inverter accommodating section (11).

11 Claims, 5 Drawing Sheets

FOREIGN PATENT DOCUMENTS

| | | |
|---|---|---|
| JP | 2004-190547 A | 7/2004 |
| JP | 3760887 B2 | 3/2006 |
| JP | 2006-179627 A | 7/2006 |
| JP | 2007-221962 A | 8/2007 |

* cited by examiner

VEHICLE-AIR-CONDITIONER ELECTRIC COMPRESSOR

TECHNICAL FIELD

The present invention relates to a vehicle-air-conditioner electric compressor of an inverter-integrated type in which an inverter accommodating section is provided at a periphery of a housing containing an electric motor and a compression mechanism, and an inverter is integrally installed inside the inverter accommodating section.

BACKGROUND ART

In recent years, various kinds of inverter-integrated electric compressors formed by integrally installing inverters therein have been proposed as compressors for air conditioners adopted in vehicles. In such a vehicle-air-conditioner electric compressor of an inverter-integrated type, an inverter accommodating section (i.e., an inverter box) is provided at a periphery of a housing containing an electric motor and a compression mechanism, and an inverter, which converts direct-current power supplied from a high-voltage power source to three-phase alternating-current power and supplies it to the electric motor via glass-insulated terminals, is installed inside the inverter accommodating section, so that the rotation speed of the electric compressor can be controlled according to the air-conditioning load. Such an inverter-integrated electric compressor for a vehicle is known from, for example, Patent Documents 1 and 2.

As discussed in Patent Documents 1 and 2, the aforementioned inverter is constituted by, for example, a power circuit board having mounted thereon power semiconductor switching devices that generally receive high voltage and a gate circuit for operating these devices; a control board (printed board) having mounted thereon control and communication circuits that operate at low voltage; high-voltage components such as a head capacitor (i.e., a smoothing capacitor), an inductor coil, and a common mode coil that are connected to high-voltage power lines; and a bus bar assembly for use as electrical wiring between high-voltage power-supply terminals, the high-voltage components, and the power circuit board. These components are accommodated inside the inverter accommodating section (i.e., an inverter box or an outer shell) so as to be integrated into the electric compressor.

Patent Document 1:
Japanese Unexamined Patent Application, Publication No. 2004-190547
Patent Document 2:
The Publication of Japanese Patent No. 3760887

DISCLOSURE OF INVENTION

In the aforementioned inverter, the power circuit board and the control board are disposed in the inverter accommodating section by being screwed to fixing-screw base surfaces provided at a plurality of locations of the inverter accommodating section. However, regarding each of these boards, because the board itself is thin and the strength thereof against deformation, such as bending and warping, is not so high, the board vibrates by resonating with the vibration of the vehicle and becomes deformed, thus easily leading to problems such as detachment of the devices on the board, rupturing of soldered sections and welded sections, and short circuits. Likewise, the bus bars also resonate with the vibration of the vehicle, and when the amplitude thereof increases, problems such as rupturing of welded sections and short circuits readily occur.

As conceivable countermeasures against the aforementioned problems, for example, the vibration and deformation of the boards caused by the vibration of the vehicle can be minimized by increasing the thickness of the boards to enhance the rigidity thereof or by increasing the number of locations at which the boards are to be screwed. However, because these countermeasures lead to an increase in the volume and the weight of the inverter accommodating section and thus cause it to lose its compact and lightweight advantages, these countermeasures are not appropriate as preferred countermeasures.

In view of these circumstances, an object of the present invention is to provide a highly reliable vehicle-air-conditioner electric compressor of an inverter-integrated type that minimizes vibration and deformation of a board and a bus bar caused by vibration of a vehicle so as to prevent devices from becoming detached, to prevent soldered sections and welded sections from rupturing, and to prevent short circuits from occurring.

In order to achieve the aforementioned object, a vehicle-air-conditioner electric compressor of the present invention employs the following solutions.

A first aspect of the present invention provides a vehicle-air-conditioner electric compressor in which an inverter accommodating section is provided at a periphery of a housing containing an electric motor and a compression mechanism, and an inverter that converts direct-current power supplied from a high-voltage power source to three-phase alternating-current power and supplies it to the electric motor is accommodated inside the inverter accommodating section. In this vehicle-air-conditioner electric compressor, a control board constituting the inverter is screwed to fixing-screw base surfaces provided at a plurality of locations of the inverter accommodating section, and a base that has the same height as the fixing-screw base surfaces and supports the control board near substantially a midpoint of a fixing-screw pitch on the control board and/or near a position where a large component is disposed on the control board is provided at one or more locations of the inverter accommodating section.

According to this aspect, the control board constituting the inverter is screwed to the fixing-screw base surfaces provided at a plurality of locations, and the base having the same height as the fixing-screw base surfaces and provided at one or more locations of the inverter accommodating section supports the control board near substantially the midpoint of the fixing-screw pitch on the control board and/or near the position where the large component is disposed on the control board. Therefore, vibration and deformation (bending and warping) of the control board caused by vibration of a vehicle can be minimized since the control board is supported in contact with the base. Consequently, devices on the control board can be prevented from becoming detached, soldered sections and welded sections can be prevented from rupturing, and short circuits can be prevented from occurring, thereby improving the reliability of the vehicle-air-conditioner electric compressor of an inverter-integrated type. Since the base can be integrally formed with the inverter accommodating section, the base can be formed readily without requiring an extra cost.

In the above aspect, the aforementioned vehicle-air-conditioner electric compressor may be configured such that the base is provided in correspondence to a boundary section between different grounding systems of the control board.

A section to be supported by the base must not overlap a pattern provided on the control board. In a control board having different grounding systems, for example, a high-voltage grounding system and a low-voltage grounding system, a section where the pattern does not exist is provided so as to ensure an insulation distance. In the above configuration, because the base is provided in correspondence to the boundary section, which is located between the different grounding systems where the pattern does not exist, damage to the pattern occurring as a result of it coming into contact with the base can be prevented.

In the above aspect, one of the aforementioned vehicle-air-conditioner electric compressors may be configured such that the base is provided in correspondence to an outer peripheral section of a pattern on the control board.

According to the above configuration, because the base is provided in correspondence to the outer peripheral section of the pattern on the control board, the outer peripheral section of the board, which does not overlap the pattern, can be supported by the base. Consequently, damage to the pattern on the control board as a result of it coming into contact with the base can be prevented.

In the above aspect, any one of the aforementioned vehicle-air-conditioner electric compressors may be configured such that an elastic member is interposed between the control board and the base.

According to the above configuration, because the elastic member is interposed between the control board and the base, a shock that may occur when the control board hits the base as a result of vibration of the control board can be absorbed by the elastic member. Consequently, damage to or noise created by the control board itself can be minimized.

In the above configuration, in the aforementioned vehicle-air-conditioner electric compressor, the elastic member may be interposed by being adhered to either the control board or the base.

According to the above configuration, because the elastic member is adhered to either the control board or the base, the elastic member can be prevented from falling off. Consequently, the elastic member can continue to exhibit its effect of preventing damage to or noise created by the control board.

In the above aspect, any one of the aforementioned vehicle-air-conditioner electric compressors may be configured such that a reinforcing member is attached to a section of the control board where a pattern thereof does not exist.

Accordingly, since the reinforcing member is attached to the section of the control board where the pattern thereof does not exist, the strength and the rigidity of the control board itself can be increased by the reinforcing member, thereby minimizing vibration and deformation (bending and warping) of the control board caused by vibration of the vehicle. This can prevent the control board itself from being damaged or creating noise, which may be caused when the control board hits the base as a result of vibration and deformation of the control board.

In the above aspect, the aforementioned vehicle-air-conditioner electric compressor may be configured such that the reinforcing member is formed of an electrically nonconductive member.

Accordingly, since the reinforcing member is formed of an electrically nonconductive member composed of a resin material, etc., the reinforcing member can be attached without the need to ensure a particularly long distance for the section of the control board where the pattern thereof does not exist. Thus, the reinforcing member can be directly attached to the existing boundary section between the different grounding systems, whereby its implementation is simpler, as compared to the case where an electrically conductive member is used. It is to be noted that the above configuration is not intended to preclude the use of an electrically conductive member for the reinforcing member.

In the above aspect, one of the aforementioned vehicle-air-conditioner electric compressors may be configured such that the reinforcing member is attached to either a top surface or a bottom surface of the control board by screwing, adhering, soldering, or welding.

Accordingly, since the reinforcing member is attached to either the top surface or the bottom surface of the control board by screwing, adhering, soldering, or welding, the reinforcing member and the control board can be reliably integrated into a single unit, thereby increasing the strength and the rigidity of the control board. Consequently, vibration and deformation (bending and warping) of the control board can be minimized, thereby preventing the control board itself from being damaged or creating noise, which may be caused when the control board hits the base as a result of vibration and deformation thereof.

A second aspect of the present invention provides a vehicle-air-conditioner electric compressor in which an inverter accommodating section is provided at a periphery of a housing containing an electric motor and a compression mechanism, and an inverter that converts direct-current power supplied from a high-voltage power source to three-phase alternating-current power and supplies it to the electric motor is accommodated inside the inverter accommodating section. In this vehicle-air-conditioner electric compressor, a control board constituting the inverter is screwed to fixing-screw base surfaces provided at a plurality of locations of the inverter accommodating section, and a reinforcing member that reinforces the strength of the control board is attached to a section of the control board where a pattern thereof does not exist.

According to this aspect, because the control board constituting the inverter is screwed to the fixing-screw base surfaces provided at a plurality of locations, and the reinforcing member that reinforces the strength of the control board is attached to the section of the control board where the pattern thereof does not exist, the strength and the rigidity of the control board itself can be increased by this reinforcing member, thereby minimizing vibration and deformation (bending and warping) of the control board caused by vibration of the vehicle. Consequently, devices on the control board can be prevented from becoming detached, soldered sections and welded sections can be prevented from rupturing, and short circuits can be prevented from occurring, thereby improving the reliability of the vehicle-air-conditioner electric compressor of an inverter-integrated type.

A third aspect of the present invention provides a vehicle-air-conditioner electric compressor in which an inverter accommodating section is provided at a periphery of a housing containing an electric motor and a compression Mechanism, and an inverter that converts direct-current power supplied from a high-voltage power source to three-phase alternating-current power and supplies it to the electric motor is accommodated inside the inverter accommodating section. In this vehicle-air-conditioner electric compressor, a control board constituting the inverter is screwed to fixing-screw base surfaces provided at a plurality of locations of the inverter accommodating section, a bus bar assembly formed by insert molding using an insulating resin material is used to connect between the control board and other electrical components disposed in the inverter accommodating section, and at least one location of the bus bar assembly is screwed to the inverter accommodating section.

According to this aspect, because the control board constituting the inverter is screwed to the fixing-screw base surfaces provided at a plurality of locations, the bus bar assembly formed by insert molding using an insulating resin material is used to connect between the control board and the other electrical components, and at least one location of the bus bar assembly is screwed to the inverter accommodating section, the control board and the bus bar assembly connected thereto can both be supported stably, thereby minimizing vibration and deformation (bending and warping) of the control board and the bus bar assembly caused by vibration of the vehicle. Consequently, soldered sections and welded sections on the control board and on the bus bar assembly can be prevented from rupturing and short circuits can be prevented from occurring, thereby improving the reliability of the vehicle-air-conditioner electric compressor of an inverter-integrated type.

In the above aspect, the aforementioned vehicle-air-conditioner electric compressor may be configured such that the bus bar assembly is screwed to one of the fixing-screw base surfaces for the control board.

Accordingly, since the bus bar assembly is screwed to one of the fixing-screw base surfaces for the control board, the bus bar assembly and the control board can be fixed to each other by sharing one fixing-screw base surface. Consequently, the space inside the inverter accommodating section can be used efficiently without the need to increase the number of fixing-screw base surfaces, and the internal configuration of the inverter accommodating section can be simplified.

According to the present invention, since vibration and deformation (bending and warping) of the control board and the bus bar caused by the vibration of the vehicle can be minimized, it is possible to provide a highly reliable vehicle-air-conditioner electric compressor of an inverter-integrated type that can prevent devices on the board from becoming detached, that can prevent soldered sections and welded sections from rupturing, and that can prevent short circuits from occurring.

EXPLANATION OF REFERENCE SIGNS

1: vehicle-air-conditioner electric compressor
2: housing
9: electric motor
11: inverter accommodating section
20: inverter
21: head capacitor
22: inductor coil
23: common mode coil
25: power circuit board
26: control board
27: bus bar assembly
27A: fixed boss section
27B: screw retaining hole
29, 29A: fixing-screw base surfaces
30, 30A: screws
36: isolated transformer
38: boundary section
39: outer peripheral section
40: base
50: elastic member
60: reinforcing member
HV: high-voltage grounding-system pattern region
LV: low-voltage grounding-system pattern region

BEST MODE FOR CARRYING OUT THE INVENTION

Figure 1:
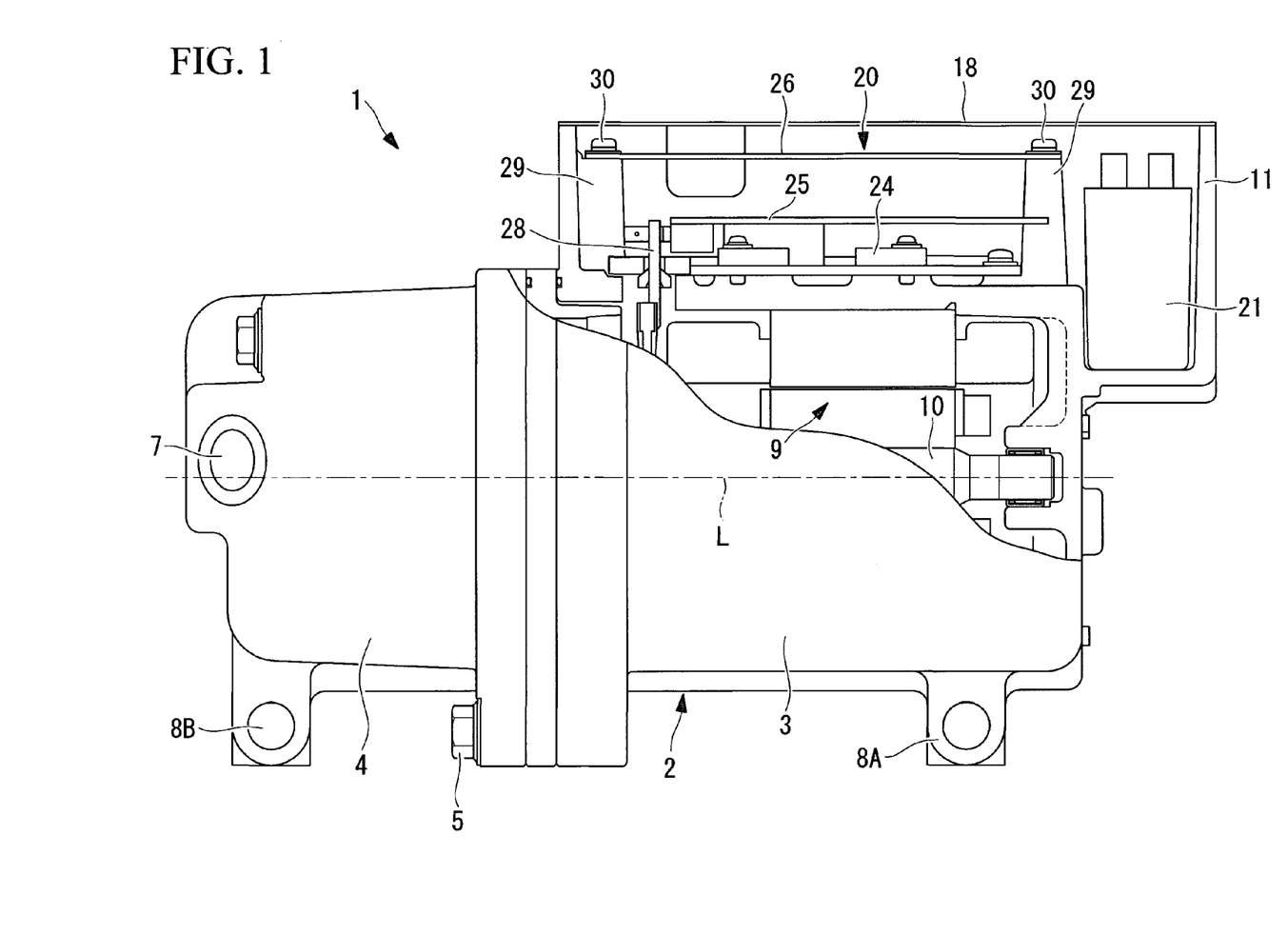
FIG. 1 is a partial longitudinal sectional view showing an inverter accommodating section of a vehicle-air-conditioner electric compressor according to a first embodiment of the present invention.
Figure 2:
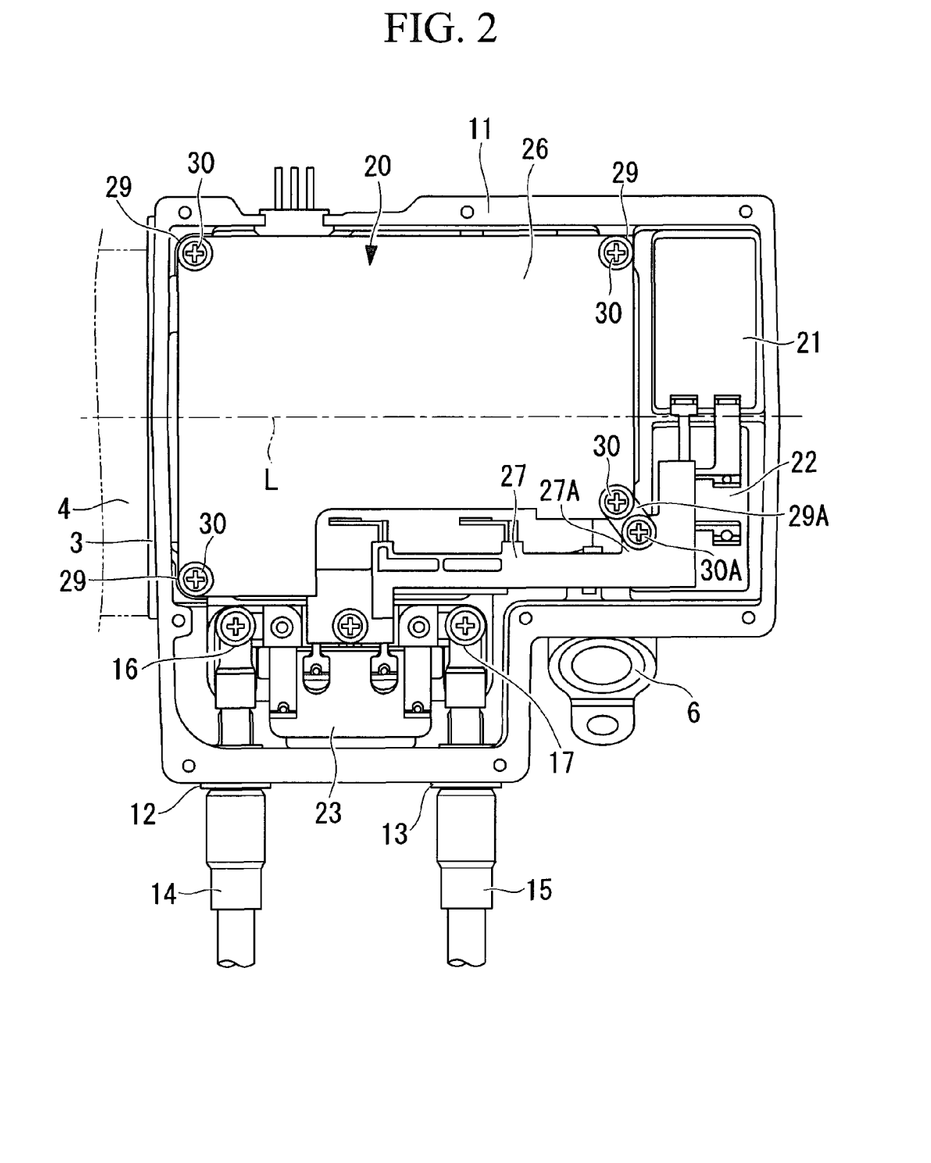
FIG. 2 is a plan view showing a state where a cover member for the inverter accommodating section of the vehicle-air-conditioner electric compressor shown in FIG. 1 is removed.

Embodiments according to the present invention will be described below with reference to the drawings.
(First Embodiment)
A first embodiment of the present invention will be described below with reference to FIGS. 1 to 3, 5A and 5B.
FIG. 1 is a partial longitudinal sectional view showing an inverter accommodating section of a vehicle-air-conditioner electric compressor according to a first embodiment of the present invention. FIG. 2 is a plan view showing a state where a cover member therefor is removed.

A vehicle-air-conditioner electric compressor 1 is equipped with a housing 2 constituting an outer shell thereof. The housing 2 is formed by tightly fixing a motor housing 3, which accommodates an electric motor 9, and a compressor housing 4, which accommodates a compression mechanism (not shown), together by means of bolts 5. The motor housing 3 and the compressor housing 4 are pressure-resistant containers and are formed by aluminum die-casting using an aluminum alloy.

The electric motor 9 and the compression mechanism (not shown) that are contained inside the housing 2 are linked to each other via a motor shaft 10 (see FIG. 1), and the compression mechanism is configured to be driven by rotation of the electric motor 9. One end (i.e., the right side in FIG. 1) of the motor housing 3 is provided with a refrigerant suction port 6 (see FIG. 2), and low-temperature low-pressure refrigerant gas taken into the motor housing 3 through this refrigerant suction port 6 flows in a direction of a motor axis L by traveling around the electric motor 9 and is subsequently taken in by the compression mechanism so as to be compressed. High-temperature high-pressure refrigerant gas compressed by the compression mechanism is discharged into the compressor housing 4 and is subsequently delivered to the outside from a discharge port 7 provided at one end (i.e., the left side in FIG. 1) of the compressor housing 4.

The housing 2 is provided with mounting legs 8A, 8B, and 8C (8C not shown) at a total of three locations, namely, two locations at a lower part at one end (i.e., the right side in FIG. 1) of the motor housing 3 and a lower part at one end (i.e., the left side in FIG. 1) of the compressor housing 4 and one location at an upper part of the compressor housing 4. The vehicle-air-conditioner electric compressor 1 is installed by fixing these mounting legs 8A, 8B, and 8C to a sidewall, etc. of an engine, disposed inside an engine compartment of a vehicle, by means of brackets and bolts. Generally, the vehicle-air-conditioner electric compressor 1 is supported in a cantilevered fashion at three upper and lower positions via fixing brackets such that the direction of the motor axis L thereof is oriented in the front-rear direction or the left-right direction of the vehicle.

A box-shaped inverter accommodating section 11 is integrally formed at an upper part of a periphery of the motor housing 3. FIG. 1 shows a partial longitudinal sectional view of this inverter accommodating section 11. As shown in FIGS. 1 and 2, the inverter accommodating section 11 has a box structure having an open upper surface and surrounded by peripheral walls of a predetermined height, and an opening in the upper surface thereof is insulated by fixing a cover member 18 thereon with screws, with a sealing member (not shown) disposed therebetween. One side surface of this inverter accommodating section 11 is provided with two power-cable outlets 12 and 13 so that a high-voltage power source and an inverter 20 disposed inside the inverter accommodating section 11 are connected to each other via two power cables 14 and 15.

The inverter 20 disposed inside the inverter accommodating section 11 is constituted by electrical components, which include P-N terminals 16 and 17 connected to the power cables 14 and 15; high-voltage components such as a head capacitor 21, an inductor coil 22, and a common mode coil 23 that are connected to high-voltage power lines; a power circuit board 25 having mounted thereon a plurality of power semiconductor switching devices 24 (i.e., power devices such as IGBTs: insulated gate bipolar transistors) and a power-system control circuit (not shown) for operating these devices; a control board (printed board) 26 having mounted thereon control and communication circuits (not shown) having devices that operate at low voltage, such as a CPU; a bus bar assembly 27 formed by integrating a plurality of bus bars, for use as electrical wiring between the high-voltage components 21, 22, and 23, the P-N terminals 16 and 17, and the boards 25 and 26 that constitute the inverter 20, into a single unit by insert molding using an insulating resin material; and glass-insulated terminals 28 that pass three-phase alternating-current power converted by the inverter 20 to the electric motor 9.

As described above, in the vehicle-air-conditioner electric compressor 1 of an inverter-integrated type formed by integrally installing the inverter 20 therein, the inverter accommodating section 11 is provided at the periphery of the housing 2 (motor housing 3), and the inverter 20 is accommodated inside the inverter accommodating section 11. In the inverter 20, the power circuit board 25 and the control board (printed board) 26 generally have a substantially rectangular shape, and the corner sections thereof are screwed to fixing-screw base surfaces 29, provided at a plurality of locations (four locations) in the inverter accommodating section 11, by means of screws 30.

Figure 3:
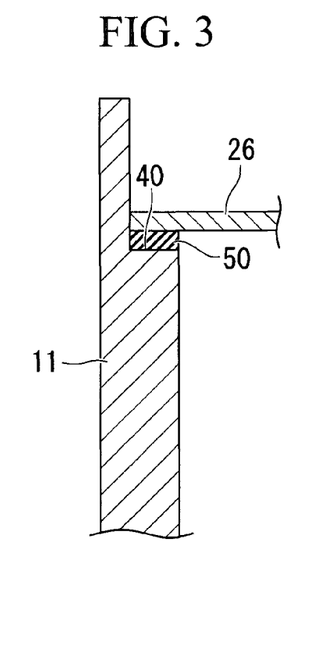
FIG. 3 is a partial longitudinal sectional view showing a board-supporting section defined by a base of the vehicle-air-conditioner electric compressor shown in FIG. 1.

Taking the control board (printed board) 26 as an example, a supporting structure therefor will be described below in further detail with reference to FIGS. 3, 5A and 5B. Where necessary, a supporting structure for the power circuit board 25 can be the same as that described below.

Regarding the control board 26, the board itself generally has a thickness of about several millimeters, and both the strength and the rigidity thereof are not so high. As shown in FIG. 5A and 5B (FIG. 5A showing the top surface and FIG. 5B showing the bottom surface), a pattern (circuit) of an isolated DC-DC converter 31, a communication circuit 32, a motor control microcomputer 33, another control circuit 34, etc. is provided on the control board 26. The pattern on this control board 26 is divided into a high-voltage grounding-system pattern region HV on which the motor control microcomputer 33 and another control circuit 34 are mounted and a low-voltage grounding-system pattern region LV on which the communication circuit 32, etc. is mounted, and a region not having the pattern is formed therebetween so as to ensure an insulation distance I.

The control systems, etc. of the high-voltage grounding-system pattern region HV and the low-voltage grounding-system pattern region LV are connected to each other via a photo-coupler 35, which is an isolated communication connector, and an isolated transformer 36. With this configuration, the communication circuit 32, the motor control microcomputer 33, and another control circuit 34 mounted on the control board 26 are all configured to be operated by low voltage supplied thereto from a low-voltage cable 37 via the isolated DC-DC converter 31.

Although four corner sections of the control board 26 are screwed to the fixing-screw base surfaces 29, provided at four locations in the inverter accommodating section 11, by means of the screws 30, as shown in FIG. 2, because the strength and the rigidity of the board itself are not very high, the board may possibly become deformed (bent or warped) as a result of resonating with the vibration of the vehicle, thus causing detachment of the devices on the board, rupturing of soldered sections and welded sections, short circuits, etc. Therefore, as shown in FIG. 3, a base 40 is provided independently of the fixing-screw base surfaces 29, used for screwing the control board 26 to the inverter accommodating section 11, so as to support the control board 26.

The base 40 is provided at one or more locations of the inverter accommodating section 11 so as to support the control board 26 near the midpoint of a fixing-screw pitch of the four screws 30 or near the position where a large component, such as the transformer 36, is disposed. The base 40 is provided at the same height as the fixing-screw base surfaces 29, and the supporting face thereof is about several millimeters wide so as not to lead to an increase in the volume and the weight of the inverter accommodating section 11. Although the base 40 should be provided at a position where it can support the control board 26 near the aforementioned position, because this position to be supported by the base 40 must not overlap the pattern (circuit) provided on the control board 26, the base 40 is provided at a position that corresponds to a boundary section 38 (i.e., a region corresponding to the insulation distance I), which is located between the high-voltage grounding-system pattern region HV and the low-voltage grounding-system pattern region LV where the pattern does not exist, or at a position that corresponds to an outer peripheral section 39 of the pattern.

Even if the control board 26 is configured to be supported from below by the base 40 to minimize vibration and deformation of the control board 26, as described above, there is still a possibility that the control board 26 may sometimes hit the base 40. Therefore, an elastic member 50 is interposed between the control board 26 and the base 40, as shown in FIG. 3. In this case, the elastic member 50 may simply be sandwiched between the control board 26 and the base 40, but in order to prevent the elastic member 50 from falling off, it is preferable that the elastic member 50 be interposed by being adhered to either the control board 26 or the base 40 with an adhesive.

With the configuration described above, this embodiment provides the following advantages.

Direct-current power supplied from the high-voltage power source installed in the vehicle to the P-N terminals 16 and 17 of the inverter 20 of the electric compressor 1 via the power cables 14 and 15 is regulated by the high-voltage components, such as the head capacitor 21, the inductor coil 22, and the common mode coil 23, and is subsequently input to the power circuit board 25. By a switching operation of the plurality of power semiconductor switching devices (such as IGBTs) mounted on the power circuit board 25, this direct-current power is converted to three-phase alternating-current power having a frequency according to a control command instructed by a higher-level controller (not shown) via the communication circuit 32 of the control board 26, and is subsequently supplied to the electric motor 9 in the motor housing 3 via the glass-insulated terminals 28.

Accordingly, the electric motor 9 is rotationally driven based on the frequency according to the control command, whereby the compression mechanism is operated. The operation of the compression mechanism causes low-temperature low-pressure refrigerant gas to be taken into the motor housing 3 through the refrigerant suction port 6. This refrigerant flows in the direction of the motor axis L by traveling around the electric motor 9 towards the compressor housing 4, is taken in by the compression mechanism so as to be compressed to a high-temperature high-pressure state, and is then discharged into the compressor housing 4. The high-temperature high-pressure refrigerant is delivered to the outside of the electric compressor 1 through the discharge port 7. In the mean time, the low-temperature low-pressure refrigerant gas taken into the motor housing 3 through the refrigerant suction port 6 and flowing in the direction of the motor axis L travels along a wall surface of the motor housing 3 so as to cool heat-generating components, such as the high-voltage components 21, 22, and 23 and the power semiconductor switching devices 24 of the inverter 20 disposed in the inverter accommodating section 11.

While the electric compressor 1 is operating in the above-described manner, the electric compressor 1 not only vibrates due to its own operation, but also receives the running vibration of the vehicle. Therefore, the electric compressor 1 and the inverter 20 integrated therein are both constantly subjected to vibration. The control board 26 and the power circuit board 25 of the inverter 20 has a small thickness, and the strength and the rigidity thereof are not high, meaning that the vibration-resisting strength thereof is not very high. In particular, because the control board 26 has a larger area than the power circuit board 25 and is supported only at the four corner sections thereof, the vibration-resisting strength thereof is lower than that of the power circuit board 25. Therefore, the control board 26 may sometimes vibrate intensely by resonating with the vibration of the vehicle.

In this embodiment, in addition to being screwed to the fixing-screw base surfaces 29 at the four locations, the control board 26 is supported from below by the base 40 provided at one or more locations of the inverter accommodating section 11 such that the base 40 supports the control board 26 substantially near the midpoint between the fixing-screw base surfaces 29 and/or near the position where a large component, such as the transformer 36, is disposed, thereby minimizing vibration and deformation (bending and warping) of the control board 26 caused by resonance with the vibration of the vehicle.

Consequently, the devices on the control board 26 can be prevented from becoming detached, the soldered sections and the welded sections can be prevented from rupturing, and short circuits can be prevented from occurring, thereby improving the reliability of the vehicle-air-conditioner electric compressor 1 of an inverter-integrated type. Since the base 40 can be integrally formed with the inverter accommodating section 11, the base 40 can be formed readily without requiring an extra cost. Since the supporting face thereof can be several millimeters wide, there is no possibility of leading to an increase in the volume and the weight of the inverter accommodating section 11, and the base 40 is therefore not a hindrance to reducing the size and weight.

With regard to providing the base 40, in order to prevent it from overlapping the pattern (circuit) provided on the control board 26, the base 40 is provided in correspondence to the boundary section 38, which is located between the high-voltage grounding-system pattern region HV and the low-voltage grounding-system pattern region LV where the pattern does not exist, or to the outer peripheral section 39 of the pattern. This can reliably prevent the pattern (circuit) on the control board 26 from being damaged as a result of the pattern coming into contact with the base 40.

Furthermore, the elastic member 50 is interposed between the base 40 and the control board 26, and moreover, the elastic member 50 is adhered to either the control board 26 or the base 40. Consequently, a shock that may sometimes occur when the control board 26 hits the base 40 as a result of vibration or deformation of the control board 26 can be absorbed by the elastic member 50, thereby minimizing damage to or noise created by the control board 26, and continuing to exhibit the effect of the elastic member 50 by preventing it from falling off.

(Second Embodiment)

A second embodiment of the present invention will now be described with reference to FIGS. 4, 5A and 5B.

This embodiment differs from the first embodiment described above in that a reinforcing member 60 is provided in place of or in addition to the elastic member 50. Other points are similar to those in the first embodiment, and therefore, the descriptions thereof will be omitted.

Figure 4:
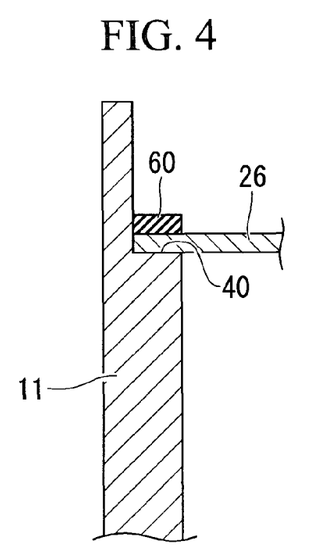
FIG. 4 is a partial longitudinal sectional view showing a board-supporting section defined by a base of a vehicle-air-conditioner electric compressor according to a second embodiment of the present invention.
Figure 5A:
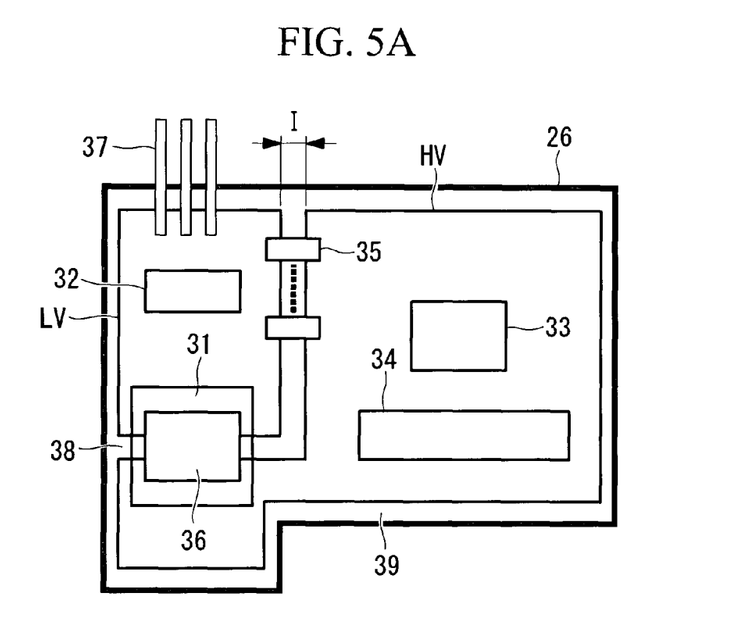
FIG. 5A is a top view schematically showing a control board of the vehicle-air-conditioner electric compressor according to the first and second embodiments of the present invention.
Figure 5B:
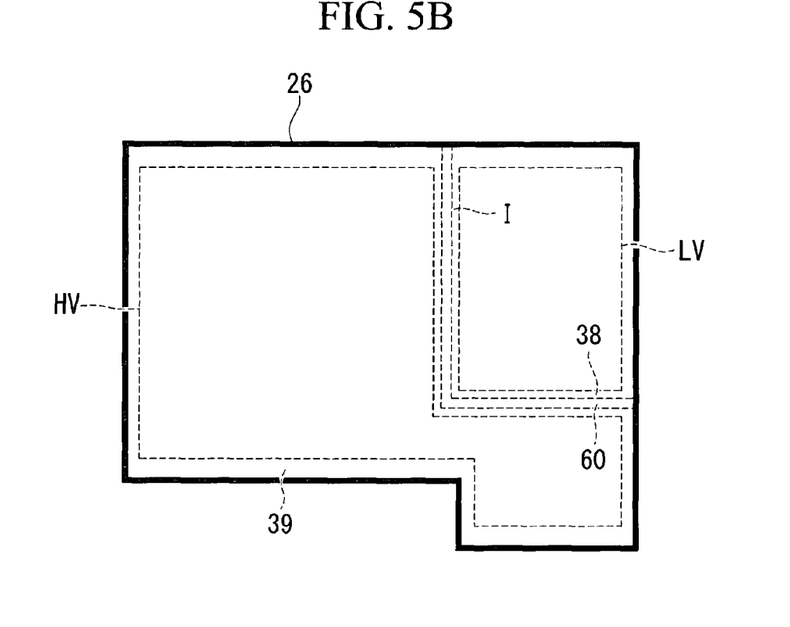
FIG. 5B is a bottom view schematically showing a control board of the vehicle-air-conditioner electric compressor according to the first and second embodiments of the present invention.

As shown in FIGS. 4, 5A and 5B, this embodiment is configured such that the reinforcing member 60 is attached to either the top surface or the bottom surface of the control board 26 so as to increase the strength and the rigidity of the control board 26.

The reinforcing member 60 is attached to the boundary section 38, which is located between the high-voltage grounding-system pattern region HV and the low-voltage grounding-system pattern region LV where the pattern (circuit) of the control board 26 does not exist, or to the outer peripheral section 39 of the pattern by screwing, adhering, soldering, welding, etc. so as to enhance the strength and the rigidity of the control board 26 against bending and warping to minimize deformation thereof, and is preferably provided at a position corresponding to that of the aforementioned base 40. Although the reinforcing member 60 may be formed of an electrically conductive member, it is preferable that the reinforcing member 60 be formed of an electrically nonconductive member composed of a resin material, etc. This is intended to avoid the need for a process for, for example, widening the boundary section 38 between the different grounding systems to ensure an insulation distance therebetween if the reinforcing member 60 is to be formed of an electrically conductive member.

According to this embodiment, the reinforcing member 60 is attached to a section where the pattern (circuit) of the control board 26 does not exist, and the reinforcing member 60 is attached to either the top surface or the bottom surface of the control board 26 by screwing, adhering, soldering, welding, etc., thereby integrating the reinforcing member 60 and the control board 26 into a single unit. Therefore, the strength and the rigidity of the control board 26 can be increased by the reinforcing member 60, thereby minimizing vibration and deformation (bending and warping) of the control board 26 caused by the vibration of the vehicle. This can prevent the control board 26 itself from being damaged or creating noise, which may be caused when the control board 26 hits the base 40 as a result of vibration of the control board 26.

Since the reinforcing member 60 is formed of an electrically nonconductive member composed of a resin material, etc., the reinforcing member 60 can be directly attached to the existing boundary section 38 between the different grounding systems or to the outer peripheral section 39 of the pattern, etc. without the need to ensure a new insulation distance. Thus, its implementation is simpler, as compared to the case where an electrically conductive member is used.

Although this embodiment described above is directed to an example where the reinforcing member 60 is attached to the control board 26 in the electric compressor 1 that is configured to support the control board 26 by providing the base 40 in the inverter accommodating section 11, the strength and the rigidity of the control board 26 can be increased solely by the reinforcement of the reinforcing member 60 without providing the base 40. Thus, vibration and deformation (bending and warping) of the control board 26 caused by the vibration of the vehicle can be similarly minimized with this configuration, thereby achieving the advantages of preventing the devices on the control board 26 from becoming detached, preventing the soldered sections and the welded sections from rupturing, preventing short circuits from occurring, etc.

(Third Embodiment)

A third embodiment of the present invention will now be described with reference to FIGS. 2 and 6.

This embodiment differs from the first embodiment described above in that a supporting structure for the bus bar assembly 27 has a specific characteristic. Other points are similar to those in the first embodiment, and therefore, the descriptions thereof will be omitted.

Figure 6:
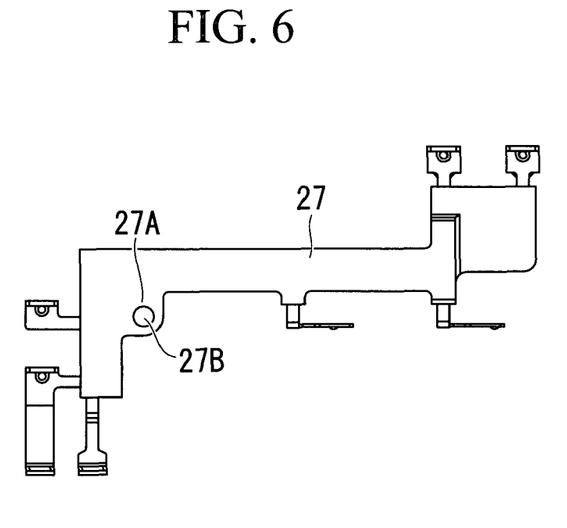
FIG. 6 is a plan view of a bus bar assembly of a vehicle-air-conditioner electric compressor according to a third embodiment of the present invention.

As shown in FIGS. 2 and 6, in this embodiment, at least one location of the bus bar assembly 27 is screwed to the inverter accommodating section 11 by means of a screw 30A. As mentioned above, the bus bar assembly 27 is formed by integrating a plurality of bus bars, for use as electrical wiring between the high-voltage components 21, 22, and 23, the P-N terminals 16 and 17, and the boards 25 and 26 of the inverter 20, into a single unit by insert molding using an insulating resin material.

As shown in FIG. 6, a fixed boss section 27A is integrally formed in a part of this bus bar assembly 27 and is provided with a screw retaining hole 27B. As shown in FIG. 2, the bus bar assembly 27 is configured to be screwed to one fixing-screw base surface 29A of the four fixing-screw base surfaces 29, to which the control board 26 is screwed, by means of the screw 30A so as to be supported in the inverter accommodating section 11 by the fixing-screw base surface 29A. This supporting position is preferably located as close to the central section of the bus bar assembly 27 as possible.

According to this embodiment, because at least one location of the bus bar assembly 27 for use as electrical wiring between the control boards 25 and 26 and the other electrical components 21, 22, and 23 is screwed to the inverter accommodating section 11, the control boards 25 and 26 and the bus bar assembly 27 connected thereto can both be supported stably, thereby minimizing vibration and deformation (bending and warping) of the control boards 25 and 26 and the bus bar assembly 27 caused by the vibration of the vehicle. Consequently, the connected sections in the control boards 25 and 26 and the bus bar assembly 27 can be prevented from rupturing and short circuits can be prevented from occurring, thereby improving the reliability of the vehicle-air-conditioner electric compressor 1 of an inverter-integrated type.

Since the bus bar assembly 27 is screwed by means of the screw 30A by sharing one fixing-screw base surface 29A of the fixing-screw base surfaces 29 for the control board 26, it is not necessary to add a new fixing-screw base surface solely designated for the bus bar assembly 27. Therefore, the space inside the inverter accommodating section 11 can be used efficiently, and the inverter accommodating section 11 can have a simplified internal configuration and can be prevented from being increased in weight.

The present invention is not limited to the above-described embodiments, and modifications are permissible so long as they do not depart from the scope of the invention. For example, the compression mechanism provided inside the compressor housing 4 may be any type of compression mechanism, such as a rotary type, a scroll type, or a swash-plate type, and is not limited in particular. The inverter accommodating section 11 does not necessarily need to be formed integrally with the motor housing 3, and may alternatively be a separately formed component that is joined thereto to construct a single unit. Although the embodiments described above are directed to an example where two boards 25 and 26 are provided above and below each other inside the inverter accommodating section 11, it is needless to say that an example with only a single board is also permissible.

The invention claimed is:

1. A vehicle-air-conditioner electric compressor in which an inverter accommodating section is provided at a periphery of a housing containing an electric motor and a compression mechanism, and an inverter that converts direct-current power supplied from a high-voltage power source to three-phase alternating-current power and supplies it to the electric motor is accommodated inside the inverter accommodating section, wherein a control board constituting the inverter is screwed to fixing-screw base surfaces provided at a plurality of locations of the inverter accommodating section, and wherein a base that has the same height as the fixing-screw base surfaces arranged upwardly from the housing side, that supports only a part of the control board near substantially a midpoint of a fixing-screw pitch on the control board or near a position where a large component is disposed on the control board, and that is provided independently of the fixing-screw base surfaces at one or more locations of the inverter accommodating section.

2. The vehicle-air-conditioner electric compressor according to claim 1, wherein the base is provided in correspondence to a boundary section between different grounding systems of the control board.

3. The vehicle-air-conditioner electric compressor according to claim 1, wherein the base is provided in correspondence to an outer peripheral section of a pattern on the control board.

4. The vehicle-air-conditioner electric compressor according to claim 1, wherein an elastic member is interposed between the control board and the base.

5. The vehicle-air-conditioner electric compressor according to claim 4, wherein the elastic member is interposed by being adhered to either the control board or the base.

6. The vehicle-air-conditioner electric compressor according to claim 1, wherein a reinforcing member is attached to a section of the control board where a pattern thereof does not exist.

7. The vehicle-air-conditioner electric compressor according to claim 6, wherein the reinforcing member is formed of an electrically nonconductive member.

8. The vehicle-air-conditioner electric compressor according to claim 6, wherein the reinforcing member is attached to either a top surface or a bottom surface of the control board by screwing, adhering, soldering, or welding.

9. A vehicle-air-conditioner electric compressor in which an inverter accommodating section is provided at a periphery of a housing containing an electric motor and a compression mechanism, and an inverter that converts direct-current power supplied from a high-voltage power source to three-phase alternating-current power and supplies it to the electric motor is accommodated inside the inverter accommodating section,
    wherein a control board constituting the inverter is screwed to fixing-screw base surfaces provided at a plurality of locations of the inverter accommodating section, and
    wherein a reinforcing member that is formed of an electrically nonconductive member and that reinforces the strength of the control board is attached to a section of the control board where a pattern thereof does not exist and only in an outer peripheral section of the control board.

10. A vehicle-air-conditioner electric compressor in which an inverter accommodating section is provided at a periphery of a housing containing an electric motor and a compression mechanism, and an inverter that converts direct-current power supplied from a high-voltage power source to three-phase alternating-current power and supplies it to the electric motor is accommodated inside the inverter accommodating section,
    wherein a control board constituting the inverter is screwed to fixing-screw base surfaces provided at a plurality of locations of the inverter accommodating section, and
    wherein a bus bar assembly formed by insert molding using an insulating resin material is used to connect between the control board and other electrical components disposed in the inverter accommodating section, and at least one substantially central location of the bus bar assembly is screwed to the inverter accommodating section.

11. The vehicle-air-conditioner electric compressor according to claim 10, wherein the bus bar assembly is screwed to one of the fixing-screw base surfaces for the control board.

* * * * *